No. 725,697. PATENTED APR. 21, 1903.
I. H. GILMAN.
BALL BEARING CENTER FOR LATHES.
APPLICATION FILED MAY 26, 1902.
NO MODEL.

Witnesses
L. H. Horner
M. R. Schnermann

Inventor
Isaac H. Gilman
By Rupus B. Fowler
Attorney.

UNITED STATES PATENT OFFICE.

ISAAC H. GILMAN, OF WORCESTER, MASSACHUSETTS, ASSIGNOR OF ONE-THIRD TO WILLIAM H. GATES, OF WORCESTER, MASSACHUSETTS.

BALL-BEARING CENTER FOR LATHES.

SPECIFICATION forming part of Letters Patent No. 725,697, dated April 21, 1903.

Application filed May 26, 1902. Serial No. 108,910. (No model.)

*To all whom it may concern:*

Be it known that I, ISAAC H. GILMAN, a citizen of the United States, residing at Worcester, in the county of Worcester and Commonwealth of Massachusetts, have invented a new and useful Improvement in Ball-Bearing Centers for Lathes, of which the following is a specification, accompanied by drawings forming a part of the same, in which—

Figure 1:
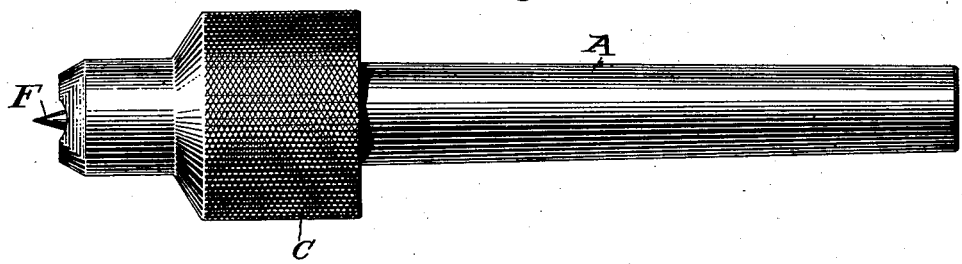
Figure 2:
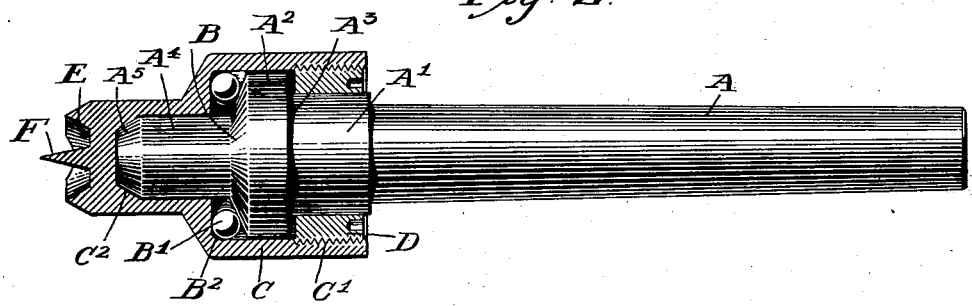
Figure 3:
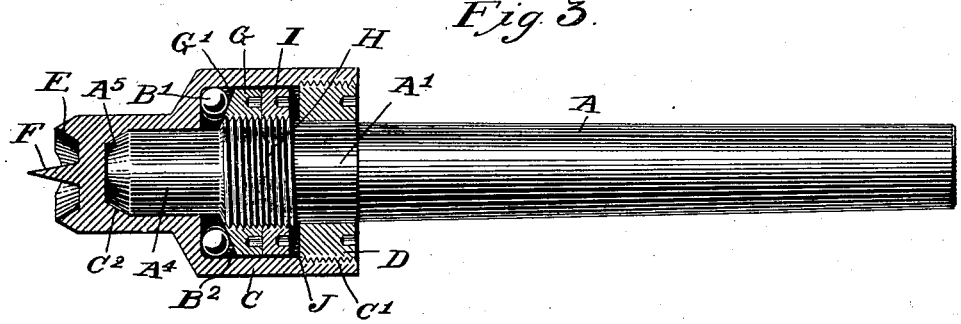

Figure 1 represents a side elevation of a lathe-center embodying my improved ball-bearing. Fig. 2 is a side elevation with the rotating sleeve shown in central sectional view; and Fig. 3 represents the same view as that shown in Fig. 2, but shows a modification in the construction.

Similar reference-letters refer to similar parts in the different views.

The object of my present invention is to reduce the friction in the dead-center of a lathe by interposing between the shank or spindle adapted to be held in the lathe-center and a rotating sleeve carrying the "center" a ball-bearing adapted to receive the end thrust and allow the center to rotate with the piece to be turned.

My improved device is specially adapted to be used in wood-turning lathes, where the piece to be turned is made to revolve with great rapidity.

Referring to the accompanying drawings, A denotes the tapered shank of a spindle adapted to fit the tail-stock of a lathe in the usual manner in lathe-centers of this class. The tapered shank A is provided with a head comprising the cylindrical section A', the cylindrical section $A^2$ of larger diameter forming a shoulder $A^3$, and the cylindrical section $A^4$, preferably having a tapered end or tip $A^5$. Between the cylindrical sections $A^2$ and $A^4$ is a beveled surface B, forming a track for a series of friction-balls B', which are held in a ball-chamber $B^2$, formed within a sleeve C, which is free to rotate. The sleeve C is provided with an internal screw-thread C' to receive a screw-threaded annular collar D, which is free to rotate upon the cylindrical section A' and by its contact with the shoulder $A^3$ prevents the removal of the sleeve C. The forward end of the sleeve is reduced in diameter and incloses the section $A^4$. The interior of the sleeve is provided with a tapered surface $C^2$, adapted to fit the tapered surface $A^5$ on the spindle. The forward closed end of the sleeve is provided with a cup-shaped depression E to engage the wood to be turned, said depression being similar to that now formed in the dead-centers of wood-turning lathes, and in addition to the cup-shaped depression E the sleeve is provided with a central spur or point F. The cylindrical section $A^2$, which in Fig. 2 is represented as integral with the spindle, in Fig. 3 is formed in a separate screw-threaded nut G, having a beveled edge G' to form a track or ball-race, said nut G being screwed upon the screw-threaded section H of the spindle, and when once adjusted in position to secure the proper bearing between the beveled surface $C^2$ and the tapered or beveled end $A^5$, the nut G is held in position by means of a check-nut I, also screwed upon the screw-threaded section H, said check-nut I forming a shoulder J for the retaining-nut D, which engages the internal screw-threads C' on the sleeve C. The construction shown in Fig. 3 allows the ball-race or track G to be nicely adjusted to secure the proper bearing between the friction-balls B' and the ball-bearing surfaces, and also between the beveled surfaces $C^2$ and $A^5$.

What I claim as my invention, and desire to secure by Letters Patent, is—

1. A dead-center for lathes consisting of a spindle having a tapered shank adapted to be held in the tail-stock of a turning-lathe, a ball-bearing surface or track formed on said spindle, an inclosing sleeve adapted to engage the work to be turned and rotating on said spindle and friction-balls inclosed between said sleeve and said spindle, substantially as described.

2. In a dead-center for lathes, the combination of a spindle adapted to be held in the tail-stock of a lathe and provided with a cylindrical section A', shoulder $A^3$ and a cylindrical section $A^4$ with a ball-track B, a sleeve C inclosing the end or head of said spindle with a series of friction-balls interposed between said sleeve and said ball-tracks, substantially as described.

3. In a dead-center for lathes, the combination with a spindle adapted so support on its end a rotating sleeve, said spindle having a ball-track thereon, of a sleeve inclosing said ball-track, a series of balls interposed between said sleeve and spindle and a collar attached to said sleeve by which said sleeve is held upon said spindle, substantially as described.

4. In a dead-center for lathes, the combination with a spindle and a sleeve arranged to rotate thereon and provided with means for engaging the work to be turned, of a screw-threaded section on said spindle, a ball-bearing nut screwed upon said screw-threaded section and having a ball track or race, a check-nut by which said ball-bearing nut is held in place and a retaining-nut by which said sleeve is held in place, substantially as described.

5. In a dead-center for lathes, the combination of a spindle provided at its forward end with a cylindrical section $A^4$, a sleeve inclosing said spindle and interposed friction-balls between said spindle and said sleeve and means for adjusting the position of said sleeve on said spindle, substantially as described.

Dated this 24th day of May, 1902.

ISAAC H. GILMAN.

Witnesses:
M. M. SCHUERMANN,
RUFUS B. FOWLER.